(12) United States Patent
Yang et al.

(10) Patent No.: US 12,229,614 B2
(45) Date of Patent: Feb. 18, 2025

(54) CARD DEVICE AND METHOD FOR MANUFACTURING CARD DEVICE

(71) Applicant: InnoLux Corporation, Miao-Li County (TW)

(72) Inventors: Hui-Ching Yang, Miao-Li County (TW); Yu-Tsung Liu, Miao-Li County (TW); Te-Yu Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/121,600

(22) Filed: Mar. 15, 2023

(65) Prior Publication Data

US 2023/0325624 A1    Oct. 12, 2023

(30) Foreign Application Priority Data

Apr. 6, 2022   (CN) .......................... 202210359219.5

(51) Int. Cl.
  *G06K 19/07*   (2006.01)
  *G06K 19/077*  (2006.01)
(52) U.S. Cl.
  CPC ....... *G06K 19/077* (2013.01); *G06K 19/0717* (2013.01)

(58) Field of Classification Search
  CPC .......................... G06K 19/077; G06K 19/0717
  USPC .......................................................... 235/492
  See application file for complete search history.

(56) References Cited

U.S. PATENT DOCUMENTS

| 4,783,823 A | 11/1988 | Tasaki | |
| 2019/0050623 A1* | 2/2019 | Lavin | ................. G06V 40/1394 |
| 2019/0392436 A1* | 12/2019 | Lee | ..................... G06V 40/1306 |
| 2022/0180142 A1* | 6/2022 | Roessner | ......... G06K 19/07773 |

FOREIGN PATENT DOCUMENTS

| WO | 2018015131 A1 | 1/2018 |
| WO | 2020/204815 A2 | 10/2020 |

* cited by examiner

*Primary Examiner* — Daniel A Hess
(74) *Attorney, Agent, or Firm* — Winston Hsu

(57) ABSTRACT

A card device and a manufacturing method thereof are disclosed. The card device includes a first substrate, a circuit board, a sensing module and a second substrate. The circuit board is disposed on the first substrate, and the circuit board includes an accommodating recess. The sensing module is disposed in the accommodating recess. The sensing module includes a sensing unit and a protective layer formed on the sensing unit, and the sensing unit is electrically connected to the circuit board. The second substrate is disposed on the circuit board. The second substrate includes an opening, and the opening exposes the protective layer.

15 Claims, 3 Drawing Sheets

CARD DEVICE AND METHOD FOR MANUFACTURING CARD DEVICE

BACKGROUND OF THE DISCLOSURE

1. Field of the Disclosure

The present disclosure relates to a card device and a method for manufacturing a card device, and more particularly to a card device including a protective layer and a related manufacturing method.

2. Description of the Prior Art

In recent years, smart cards have been widely applied in various fields such as identity authentication, finance and transportation. In addition, the smart cards may further integrate biometric technology to improve the security for users while using. For example, a smart card may have a fingerprint identification function. By disposing a sensor on the card to allow a finger to directly contact the sensor, the fingerprint identification can be performed. However, the sensor may be subject to external damage such as abrasion and scratching, or sweat may permeate the sensor after long-term contact with the finger, resulting in sensor failure.

SUMMARY OF THE DISCLOSURE

One of objectives of the present disclosure is to provide a card device and a method for manufacturing a card device, so as to solve the problems encountered by the conventional card devices. By forming the protective layer on the sensing unit, the sensing unit may be protected and the damage to the sensing unit may be reduced, or the damage to the sensing unit caused by contact may be mitigated. In addition, the provided protective layer may have the characteristic matching the type of the sensing unit, thereby improving the sensitivity of sensing.

An embodiment of the present disclosure provides a card device. The card device includes a first substrate, a circuit board, a sensing module and a second substrate. The circuit board is disposed on the first substrate, and the circuit board includes an accommodating recess. The sensing module is disposed in the accommodating recess. The sensing module includes a sensing unit and a protective layer formed on a surface of the sensing unit, and the sensing unit is electrically connected to the circuit board. The second substrate is disposed on the circuit board. The second substrate includes an opening, and the opening exposes the protective layer.

An embodiment of the present disclosure provides a card device. The card device includes a first substrate, a circuit board, a sensing unit and a protective layer. The circuit board is disposed on the first substrate, and the circuit board includes an accommodating recess. The sensing unit is disposed in the accommodating recess and electrically connected to the circuit board. The protective layer is disposed on the circuit board, and the protective layer covers the circuit board and the sensing unit.

An embodiment of the present disclosure provides a method for manufacturing a card device, which includes: providing a first substrate; providing a second substrate, wherein the second substrate includes an opening; disposing a circuit board between the first substrate and the second substrate, wherein the circuit board includes an accommodating recess corresponding to the opening; providing a sensing unit; forming a protective layer on a surface of the sensing unit; and disposing the sensing unit with the protective layer formed on the surface in the accommodating recess, wherein the sensing unit is electrically connected to the circuit board, and the opening of the second substrate exposes the protective layer.

These and other objectives of the present disclosure will no doubt become obvious to those of ordinary skill in the art after reading the following detailed description of the embodiment that is illustrated in the various figures and drawings.

DETAILED DESCRIPTION

Figure 1:
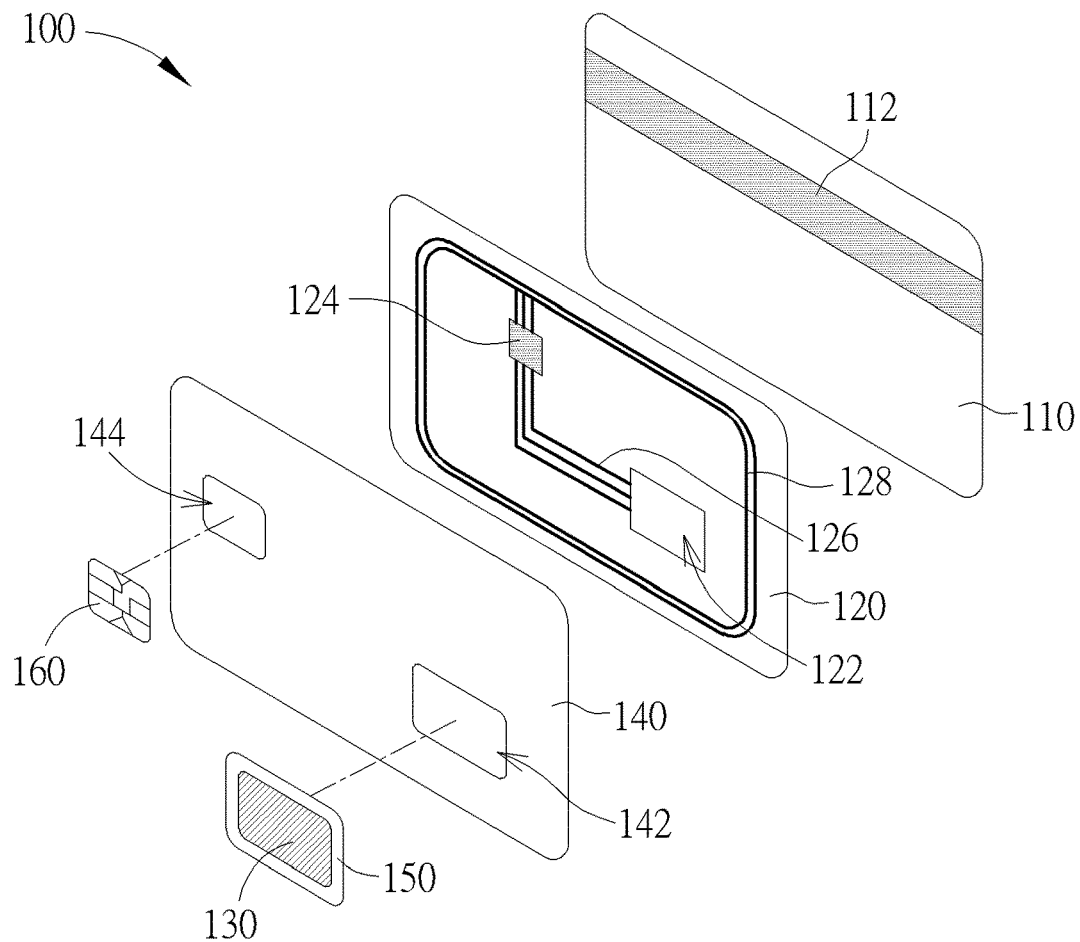
FIG. 1 is an exploded schematic diagram of a structure of a card device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, one skilled in the art may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or addition of one or a plurality of the corresponding or other features, areas, steps, operations, components and/or combinations thereof.

When an element or layer is referred to as being "on" or "connected to" another element or layer, it may be directly on or directly connected to the other element or layer, or intervening elements or layers may be presented (indirect condition). In contrast, when an element is referred to as being "directly on" or "directly connected to" another element or layer, there are no intervening elements or layers presented.

The directional terms mentioned in this document, such as "up", "down", "front", "back", "left", "right", etc., are only directions referring to the drawings. Therefore, the directional terms used are for illustration, not for limitation of the present disclosure.

The terms "about", "equal", "identical" or "the same", and "substantially" or "approximately" mentioned in this document generally mean being within 20% of a given value or range, or being within 10%, 5%, 3%, 2%, 1% or 0.5% of a given value or range.

The ordinal numbers used in the description and claims, such as "first", "second", "third", etc., are used to describe elements, but they do not mean and represent that the element(s) have any previous ordinal numbers, nor do they represent the order of one element and another element, or the order of manufacturing methods. The ordinal numbers are used only to clearly discriminate an element with a certain name from another element with the same name. The claims and the description may not use the same terms. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

Figure 2:
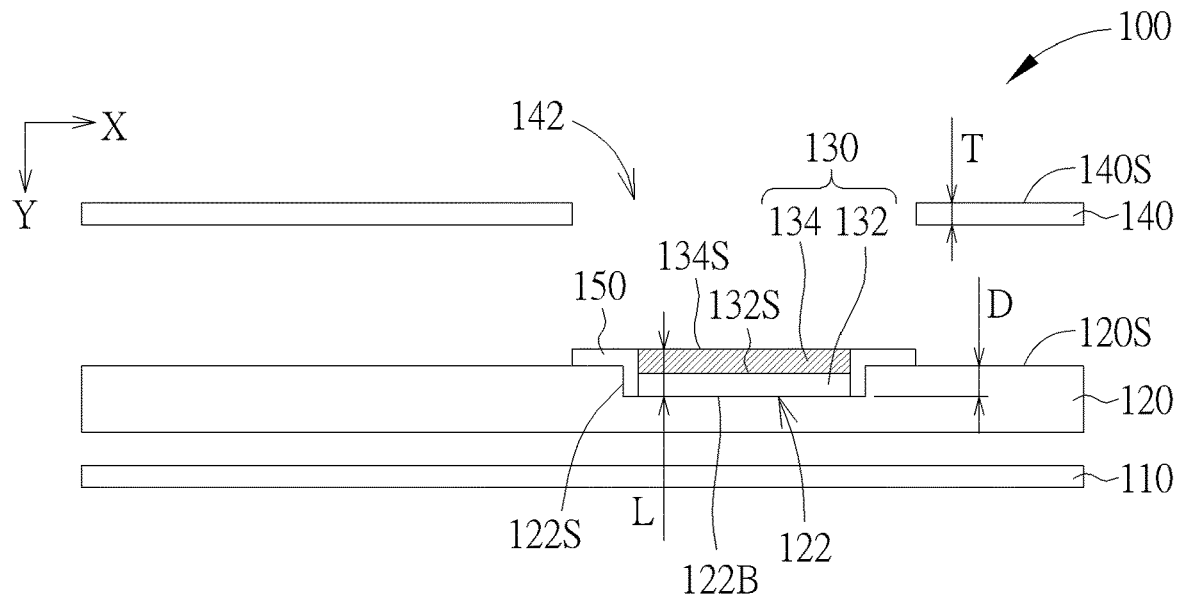
FIG. 2 is a cross-sectional exploded schematic diagram illustrating a portion of the card device according to the first embodiment of the present disclosure.

Please refer to FIG. 1 and FIG. 2. FIG. 1 is an exploded schematic diagram of a structure of a card device according to a first embodiment of the present disclosure. FIG. 2 is a cross-sectional exploded schematic diagram illustrating a portion of the card device according to the first embodiment of the present disclosure. As shown in FIG. 1 and FIG. 2, a card device 100 according to a first embodiment of the present disclosure includes a first substrate 110, a circuit board 120, a sensing module 130 and a second substrate 140. The card device 100 may be, for example, a smart card (or referred to as an integrated circuit card), and the card device 100 may be applied to an identity authentication card, a financial card, a credit card, a transportation card or other suitable cards, but not limited herein. The materials of the first substrate 110 and the second substrate 140 may respectively include plastic materials or other suitable materials, such as polyethylene terephthalate (PET), polyvinyl chloride (PVC) or polycarbonate (PC), but not limited herein. In some embodiments, a magnetic stripe 112 may be disposed on the first substrate 110, but not limited herein.

The circuit board 120 is disposed on the first substrate 110, and the circuit board 120 includes an accommodating recess 122. In some embodiments, as shown in FIG. 2, the accommodating recess 122 is a recess formed on a surface 120S of the circuit board 120, wherein the surface 120S of the circuit board 120 is located on a side opposite to the first substrate 110 and faces the second substrate 140. The accommodating recess 122 may have a depth D in a direction Y, and the accommodating recess 122 may have a bottom surface 122B and a side wall 122S connected to the bottom surface 122B. In the present disclosure, the direction Y may be a top-view direction of the card device 100, and a direction X may be a horizontal direction, that is, the direction X may be parallel to the surface 120S of the circuit board 120, and the direction Y may be perpendicular to the direction X or parallel to a normal direction of the surface 120S of the circuit board 120.

The sensing module 130 is disposed in the accommodating recess 122. The sensing module 130 includes a sensing unit 132 and a protective layer 134 formed on the sensing unit 132, and the sensing unit 132 is electrically connected to the circuit board 120. The sensing unit 132 may be a sensor for performing biometric identification, such as a fingerprint sensor, but not limited herein. In some embodiments, as shown in FIG. 2, the sensing unit 132 of the sensing module 130 may be disposed on the bottom surface 122B of the accommodating recess 122, and the sensing unit 132 may be electrically connected to the circuit board 120, for example, through a pad (not shown), but not limited herein. In some embodiments, the protective layer 134 is formed on a surface 132S of the sensing unit 132 through a deposition process, a coating process, an attaching process or other suitable processes, as shown in FIG. 2, wherein the surface 132S of the sensing unit 132 is located on a side opposite to the bottom surface 122B of the accommodating recess 122. In some embodiments, the protective layer 134 may be attached to the sensing unit 132, for example, through an adhesive layer (not shown), but not limited herein. The description "the protective layer is formed on the sensing unit" referred in the present disclosure means that the protective layer 134 cannot be moved or removed from the card device 100 after the protective layer 134 is formed on the sensing unit 132. By forming the protective layer 134 on the sensing unit 132, the sensing unit 132 may be protected and the damage to the sensing unit 132 may be reduced.

Furthermore, according to the embodiment of the present disclosure, the second substrate 140 is disposed on the circuit board 120, that is, the circuit board 120 may be disposed between the first substrate 110 and the second substrate 140. In addition, the second substrate 140 includes an opening 142. The opening 142 may correspond to the accommodating recess 122 of the circuit board 120, and the opening 142 exposes the protective layer 134 and the sensing unit 132 thereunder. Specifically, as shown in FIG. 2, the opening 142 of the second substrate 140 may expose the surface 134S of the protective layer 134, that is, the surface 134S of the protective layer 134 is not covered by the second substrate 140, wherein the surface 134S of the protective layer 134 is located on a side opposite to the sensing unit 132. Therefore, when the sensing unit 132 performs sensing procedure, such as fingerprint identification, the finger may contact the protective layer 134 of the sensing module 130, without directly contacting the sensing unit 132, thereby mitigating the damage to the sensing unit 132 caused by contact. In some embodiments, when the manufacturing for the card device 100 is finished, the second substrate 140 is formed on the circuit board 120, and the surface 134S of the protective layer 134 may be aligned with a surface 140S of the second substrate 140. For example, a distance L may exist between the upper surface 134S of the protective layer 134 and the bottom surface 122B of the accommodating recess 122 in the direction Y, the second substrate 140 may have a thickness T in the direction Y, and the distance L is substantially equal to the sum of the thickness T and the depth D of the accommodating recess 122, that is, distance L=thickness T+depth D, but not limited herein.

In some embodiments, as shown in FIG. 1 and FIG. 2, the card device 100 may further include a bezel 150, and the bezel 150 may be disposed between the accommodating recess 122 of the circuit board 120 and the sensing module 130, so that the sensing module 130 is disposed in the accommodating recess 122. Specifically, the bezel 150 may be located between the side wall 122S of the accommodating recess 122 and the sensing module 130, and the bezel 150 may circularly surround the sensing module 130 to enclose the sensing unit 132 and the protective layer 134. In some embodiments, as shown in FIG. 2, the bezel 150 may extend from the bottom surface 122B of the accommodating recess 122 to the surface 120S of the circuit board 120 along the side wall 122S, and the opening 142 of the second substrate 140 may expose the bezel 150. The upper surface of the bezel 150 may be aligned with the surface 140S of the second substrate 140 when the second substrate 140 is formed on the surface 120S of the circuit board 120, but not limited herein.

In some embodiments, as shown in FIG. 1, the card device 100 may further optionally include a chip 160. The second substrate 140 may include another opening 144, and the chip 160 may be disposed in the opening 144 and electrically connected to the circuit board 120, that is, the opening 144 may expose the chip 160. The chip 160 may be electrically connected to the circuit board 120, for example, through a pad 124 disposed on the circuit board 120, but not limited herein. In some embodiments, the chip 160 may be electrically connected to the sensing unit 132 of the sensing module 130, for example, through traces 126 disposed on the circuit board 120. In some embodiments, an antenna 128 may be further disposed on the circuit board 120, and the antenna 128 may be electrically connected to the chip 160, but not limited herein. In some embodiments, an integrated circuit, a driving unit, a control unit, a memory, an antenna decoder, and/or wires may be further disposed on the circuit board 120, so as to provide functions such as the data calculation, accessing control and/or storage, but not limited herein.

In some embodiments, the sensing unit 132 of the sensing module 130 may be a capacitive sensing unit, and a thickness and/or a dielectric constant of the protective layer 134 of the sensing module 130 meet specific conditions. Specifically, the thickness of the protective layer 134 ranges from 10 micrometers to 100 micrometers (i.e., 10 micrometers≤thickness≤100 micrometers), and/or the dielectric constant of the protective layer 134 ranges from 3 to 4 (i.e., 3≤dielectric constant≤4). Therefore, when the finger touches the protective layer 134, the sensing unit 132 may detect the difference in capacitance value change caused by the ridges and valleys, so as to sense the fingerprint image. In addition, the protective layer 134 may also have the property of scratch resistance to better protect the sensing unit 132, thereby reducing the damage to the sensing unit 132. For example, the material of the above protective layer 134 may include plastic materials or other suitable materials, such as polyethylene terephthalate (PET), but not limited herein.

In some embodiments, the sensing unit 132 of the sensing module 130 may be an optical sensing unit (such as, but not limited to, an infrared sensor), and the protective layer 134 of the sensing module 130 may allow light to pass through or allow light with a specific wavelength to pass through. Specifically, a transmittance of the protective layer 134 for the light in a wavelength range from 760 nanometers to 1 millimeter may be 80% to 100% (i.e., 80%≤transmittance≤100%). Therefore, when the finger touches the protective layer 134, the difference in light transmittance caused by the ridges and valleys may be transmitted to the sensing unit 132, and therefore the sensing unit 132 can sense the fingerprint image.

In some embodiments, the sensing unit 132 of the sensing module 130 may be an ultrasonic sensing unit, and an acoustic impedance of the protective layer 134 of the sensing module 130 may be close to the acoustic impedance of the skin, so as to reduce the signal loss caused by not matching of the impedance, wherein the acoustic impedance of the skin ranges from $1.6*10^6$ kg/m²·s to $1.7*10^6$ kg/m²·s (i.e., $1.6*10^6$ kg/m²·s≤acoustic impedance of the skin≤$1.7*10^6$ kg/m²·s). Specifically, the acoustic impedance of the protective layer 134 ranges from $1.0*10^6$ kg/m²·s to $2.5*10^6$ kg/m²·s (i.e., $1.0*10^6$ kg/m²·s≤acoustic impedance≤$2.5*10^6$ kg/m²·s). Therefore, when the finger touches the protective layer 134, the difference in acoustic waves caused by the ridges and valleys may be transmitted to the sensing unit 132, so that the sensing unit 132 can sense the fingerprint image.

In some embodiments, the sensing unit 132 of the sensing module 130 may be a thermal sensing unit, and the protective layer 134 of the sensing module 130 may conduct heat or vertically transfer heat energy. Specifically, a thermal conductivity coefficient of the protective layer 134 ranges from 150 Watts per meter-Kelvin (W/m·K) to 500 W/m·K (i.e., 150 W/m·K≤thermal conductivity coefficient≤500 W/m·K). Therefore, when the finger touches the protective layer 134, the difference in surface temperature of the ridges and valleys may be transmitted to the sensing unit 132, so that the sensing unit 132 may convert the change of temperature into the change of current, so as to sense the fingerprint image. For example, the material of the above protective layer 134 may include diamond-like carbon (DLC) with a thermal conductivity coefficient of 475 W/m·K, aluminum oxide with a thermal conductivity coefficient of 28 W/m·K, aluminum nitride with a thermal conductivity coefficient of 160 W/m·K, combinations of the above materials or other suitable materials, but not limited herein.

It should be noted that the type of the sensing unit 132 of the present disclosure is not limited to the above, and the material characteristics of the protective layer 134 are not limited to the above. Any suitable sensing unit 132 may be used in the sensing module 130 of the present disclosure, accompanied with a suitable protective layer 134.

Figure 3:
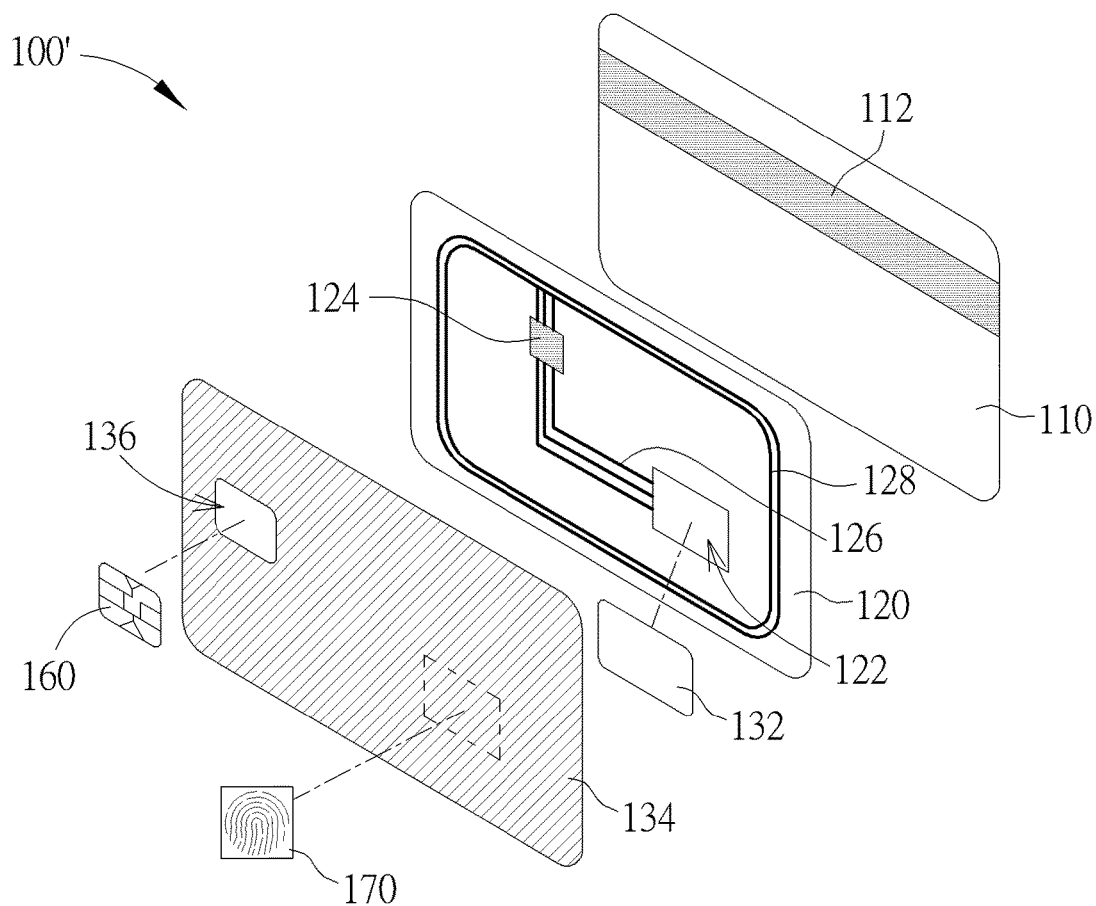
FIG. 3 is an exploded schematic diagram of a structure of a card device according to a second embodiment of the present disclosure.
Figure 4:
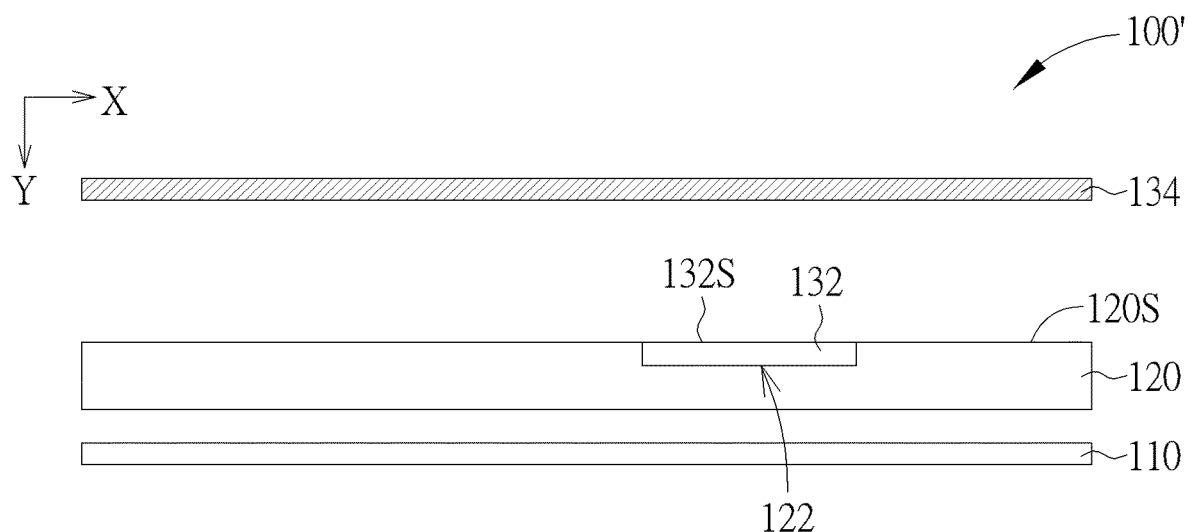
FIG. 4 is a cross-sectional exploded schematic diagram illustrating a portion of the card device according to the second embodiment of the present disclosure.

Please refer to FIG. 3 and FIG. 4. FIG. 3 is an exploded schematic diagram of a structure of a card device according to a second embodiment of the present disclosure. FIG. 4 is a cross-sectional exploded schematic diagram illustrating a portion of the card device according to the second embodiment of the present disclosure. As shown in FIG. 3 and FIG. 4, a card device 100' according to a second embodiment of the present disclosure includes a first substrate 110, a circuit board 120, a sensing unit 132 and a protective layer 134. The circuit board 120 is disposed on the first substrate 110, and the circuit board 120 includes an accommodating recess 122. The sensing unit 132 is disposed in the accommodating recess 122 and electrically connected to the circuit board 120. The sensing unit 132 may be a sensor for performing biometric identification, such as a fingerprint sensor, but not limited herein. In some embodiments, the surface 132S of the sensing unit 132 may be aligned with the surface 120S of the circuit board 120, wherein the surface 132S of the sensing unit 132 and the surface 120S of the circuit board 120 are located on a side opposite to the first substrate 110, but not limited herein.

The protective layer 134 is disposed on the circuit board 120, that is, the circuit board 120 may be disposed between the first substrate 110 and the protective layer 134, and the protective layer 134 covers the circuit board 120 and the sensing unit 132. In some embodiments, the protective layer 134 may be attached to the circuit layer 120 and the sensing unit 132, for example, through an adhesive layer (not shown), but not limited herein. By forming the protective layer 134 on the sensing unit 132, the damage to the sensing unit 132 may be reduced. In some embodiments, as shown in FIG. 3, the card device 100' may further include a fingerprint pattern 170, and the fingerprint pattern 170 is disposed on the protective layer 134 and corresponds to the sensing unit 132, so that the user is able to correspondingly press the region where the sensing unit 132 is disposed with the finger according to the position of the fingerprint pattern 170, which is beneficial to fingerprint sensing.

In addition, the applied protective layer 134 of the card device 100' may further have the characteristic matching the type of the sensing unit 132, thereby improving the sensitivity of sensing. Specifically, the sensing unit 132 may be a capacitive sensing unit, an optical sensing unit, an ultrasonic sensing unit, a thermal sensing unit or other suitable sensing units, and the characteristics and/or materials of the protective layer 134 respectively corresponding to the different types of sensing units 132 may be referred to the illustration of the previous embodiments, which will not be redundantly described herein.

In some embodiments, as shown in FIG. 3, the card device 100' may further include a chip 160. The protective layer 134 may include an opening 136, and the chip 160 may be disposed in the opening 136 and electrically connected to the circuit board 120, that is, the opening 136 may expose the chip 160. The chip 160 may be electrically connected to the circuit board 120, for example, through a pad 124 disposed on the circuit board 120, but not limited herein. In some embodiments, the chip 160 may be electrically connected to the sensing unit 132, for example, through traces 126 disposed on the circuit board 120.

The method for manufacturing the card device 100 according to an embodiment of the present disclosure may include the following steps, referring to FIG. 1 and FIG. 2.

Step S100: providing a first substrate;
Step S102: providing a second substrate, wherein the second substrate includes an opening;
Step S104: disposing a circuit board between the first substrate and the second substrate, wherein the circuit board includes an accommodating recess corresponding to the opening;
Step S106: providing a sensing unit;
Step S108: forming a protective layer on a surface of the sensing unit; and
Step S110: disposing the sensing unit with the protective layer formed on the surface in the accommodating recess, wherein the sensing unit is electrically connected to the circuit board, and the opening of the second substrate exposes the protective layer.

Specifically, the first substrate 110 is provided in Step S100, the second substrate 140 is provided in Step S102, and the second substrate 140 includes the opening 142. The materials of the first substrate 110 and the second substrate 140 may respectively include plastic materials or other suitable materials, such as polyethylene terephthalate (PET), polyvinyl chloride (PVC) or polycarbonate (PC), but not limited herein.

Then, perform Step S104 to dispose the circuit board 120 between the first substrate 110 and the second substrate 140. That is to say, the circuit board 120 is disposed on the first substrate 110, and the second substrate 140 is disposed on the circuit board 120. The circuit board 120 includes the accommodating recess 122 corresponding to the opening 142. For example, the opening 142 may at least partially overlap the accommodating recess 122 in the direction Y, as shown in FIG. 2. In some embodiments, the accommodating recess 122 may be formed on the surface 120S of the circuit board 120, the accommodating recess 122 may have the depth D in the direction Y, and the accommodating recess 122 may have the bottom surface 122B and the side wall 122S, but not limited herein.

In addition, before performing Step S104, that is, before the step of disposing the circuit board 120 between the first substrate 110 and the second substrate 140, Step S106, Step S108 and Step S110 may be performed. The sensing unit 132 is provided in Step S106. The sensing unit 132 may be a sensor for performing biometric identification, such as a fingerprint sensor, but not limited herein. In some embodiments, the sensing unit 132 may be a capacitive sensing unit, an optical sensing unit, an ultrasonic sensing unit, a thermal sensing unit or other suitable sensing units, but not limited herein.

Figure 5:
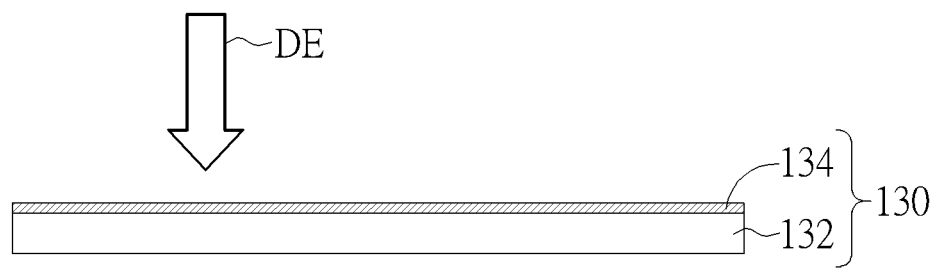
FIG. 5 is a process schematic diagram of a method for manufacturing a card device according to an embodiment of the present disclosure.
Figure 6:
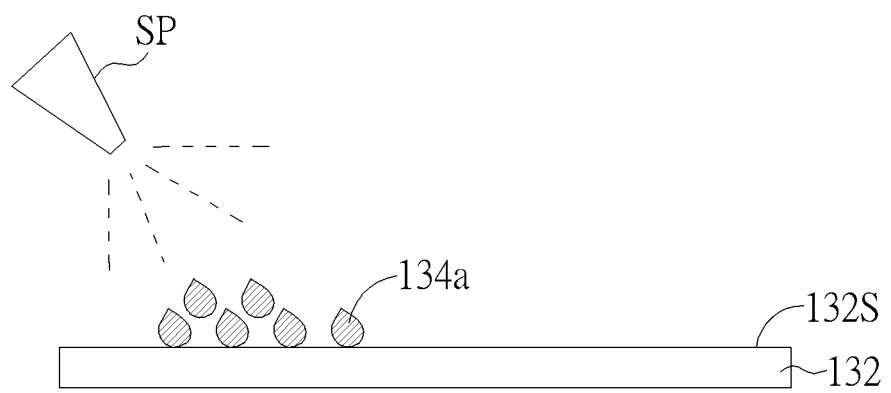
FIG. 6 is a process schematic diagram illustrating an embodiment of a fabrication process of a protective layer according to a method for manufacturing a card device of the present disclosure.
Figure 7:
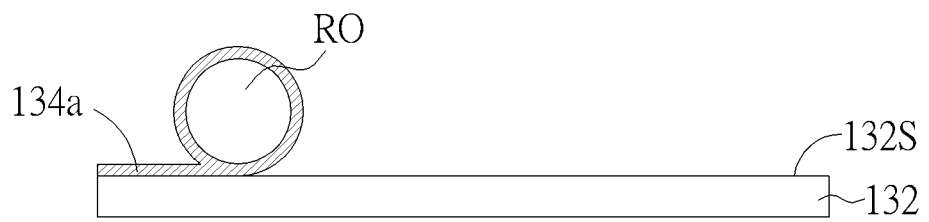
FIG. 7 is a process schematic diagram illustrating another embodiment of a fabrication process of a protective layer according to a method for manufacturing a card device of the present disclosure.
Figure 8:
FIG. 8 is a process schematic diagram illustrating still another embodiment of a fabrication process of a protective layer according to a method for manufacturing a card device of the present disclosure.

After Step S106, perform Step S108 to form the protective layer 134 on the sensing unit 132. For example, the protective layer 134 may be formed on the surface 132S of the sensing unit 132 through a deposition process, a coating process, an attaching process or other suitable processes. In some embodiments, as shown in FIG. 5, which is a process schematic diagram of a method for manufacturing a card device according to an embodiment of the present disclosure, the protective layer 134 may be formed on the sensing unit 132 through a deposition process DE, so that the sensing unit 132 and the protective layer 134 as a whole form a sensing module 130. The deposition process DE may be, for example, physical deposition, chemical deposition or other suitable deposition processes, but not limited herein. In some embodiments, the protective layer 134 may be formed on the sensing unit 132 through a coating process. The coating process may be, for example, a spray coating process, a roller coating process, a blade coating process or other suitable coating processes, but not limited herein. As shown in FIG. 6, which is a process schematic diagram illustrating an embodiment of a fabrication process of a protective layer according to a method for manufacturing a card device of the present disclosure, a protective layer material 134a may be coated on the surface 132S of the sensing unit 132 through a spray nozzle SP, so as to form the protective layer 134 on the sensing unit 132 through the spray coating process. As shown in FIG. 7, which is a process schematic diagram illustrating another embodiment of a fabrication process of a protective layer according to a method for manufacturing a card device of the present disclosure, the protective layer material 134a may be coated on the surface 132S of the sensing unit 132 through a roller RO, so as to form the protective layer 134 on the sensing unit 132 through the roller coating process. As shown in FIG. 8, which is a process schematic diagram illustrating still another embodiment of a fabrication process of a protective layer according to a method for manufacturing a card device of the present disclosure, the protective layer material 134a may be coated on the surface 132S of the sensing unit 132 through a blade BL, so as to form the protective layer 134 on the sensing unit 132 through the blade coating process. In some embodiments, the protective layer 134 may be formed on the sensing unit 132 through an attaching process. For example, the protective layer 134 is attached to the surface 132S of the sensing unit 132 through an adhesive layer (not shown), but not limited herein.

After Step S108, perform Step S110 to dispose the sensing unit 132 with the protective layer 134 formed on the surface of the sensing unit 132 in the accommodating recess 122 of the circuit board 120, wherein the sensing unit 132 is electrically connected to the circuit board 120. Specifically, the sensing unit 132 may be disposed on the bottom surface 122B of the accommodating recess 122, that is, the sensing unit 132 is disposed between the circuit board 120 and the protective layer 134, and the sensing unit 132 may be electrically connected to the circuit board 120, for example, through a pad (not shown), but not limited herein. By forming the protective layer 134 on the sensing unit 132, the sensing unit 132 may be protected and the damage to the sensing unit 132 may be reduced.

In some embodiments, after performing Step S108, that is, after the step of forming the protective layer 134 on the sensing unit 132, the sensing unit 132 and the protective layer 134 as a whole form the sensing module 130. Further, the bezel 150 may surround the sensing module 130, as shown in FIG. 1. Then, the sensing module 130 surrounded by the bezel 150 is disposed in the accommodating recess 122 of the circuit board 120, so that the sensing module 130 is disposed within the accommodating recess 122, but not limited herein.

After the step of disposing the sensing module 130 (and the bezel 150) in the accommodating recess 122 of the circuit board 120, perform Step S104 described above to dispose the circuit board 120 between the first substrate 110 and the second substrate 140. After the second substrate 140 is disposed on the circuit board 120, the opening 142 of the second substrate 140 may expose the protective layer 134, that is, the upper surface 134S of the protective layer 134 is not covered by the second substrate 140.

In some embodiments, the protective layer 134 may be designed according to the type of the sensing unit 132 to improve the sensitivity of sensing. The characteristics and/or materials of the protective layer 134 respectively corresponding to different types of sensing units 132 may be referred to the illustration of the previous embodiments, which will not be redundantly described herein.

The method for manufacturing the card device 100' according to another embodiment of the present disclosure may include the following steps, referring to FIG. 3 and FIG. 4.

Step S200: providing a first substrate;
Step S202: disposing a circuit board on the first substrate, wherein the circuit board includes an accommodating recess;
Step S204: disposing the sensing unit in the accommodating recess, wherein the sensing unit is electrically connected to the circuit board; and
Step S206: covering the circuit board with a protective layer.

Specifically, the first substrate 110 is provided in Step S200. The material of the first substrate 110 may include plastic materials or other suitable materials, such as polyethylene terephthalate (PET), polyvinyl chloride (PVC) or polycarbonate (PC), but not limited herein.

Then, perform Step S202 to dispose the circuit board 120 on the first substrate 110, wherein the circuit board 120 includes the accommodating recess 122. Then, perform Step S204 to dispose the sensing unit 132 in the accommodating recess 122, wherein the sensing unit 132 is electrically connected to the circuit board 120. The sensing unit 132 may be a sensor for performing biometric identification, and the type of the sensing unit 132 may be referred to the illustration of the previous embodiments, which will not be redundantly described herein.

Then, perform Step S206 to cover the circuit board 120 with the protective layer 134, which means the circuit board 120 is disposed between the protective layer 134 and the first substrate 110, so that the protective layer 134 may serve as the second substrate disposed opposite to the first substrate 110. The characteristics and/or materials of the protective layer 134 respectively corresponding to different types of sensing units 132 may be referred to the illustration of the previous embodiments, which will not be redundantly described herein.

From the above description, according to the card devices and the related manufacturing methods of the embodiments of the present disclosure, by forming the protective layer on the sensing unit, the sensing unit may be protected and the damage to the sensing unit may be reduced, or the damage to the sensing unit caused by contact may be mitigated. In addition, the provided protective layer may have the characteristic matching the type of the sensing unit, thereby improving the sensitivity of sensing.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A card device, comprising:
a first substrate;
a circuit board disposed on the first substrate, wherein the circuit board comprises an accommodating recess;
a sensing module disposed in the accommodating recess, wherein the sensing module comprises a sensing unit and a protective layer formed on a surface of the sensing unit, and the sensing unit is electrically connected to the circuit board;
a second substrate disposed on the circuit board, wherein the second substrate comprises an opening, and the opening exposes the protective layer; and
a bezel disposed between the accommodating recess and the sensing module, wherein the bezel exposes the protective layer.

2. The card device according to claim 1, wherein the sensing unit is a capacitive sensing unit, and a thickness of the protective layer ranges from 10 micrometers to 100 micrometers.

3. The card device according to claim 1, wherein the sensing unit is a capacitive sensing unit, and a dielectric constant of the protective layer ranges from 3 to 4.

4. The card device according to claim 1, wherein the sensing unit is an optical sensing unit, and a transmittance of the protective layer for light in a wavelength range from 760 nanometers to 1 millimeter is 80% to 100%.

5. The card device according to claim 1, wherein the sensing unit is an ultrasonic sensing unit, and an acoustic impedance of the protective layer ranges from $1.0*10^6$ $kg/m^2 \cdot s$ to $2.5*10^6$ $kg/m^2 \cdot s$.

6. The card device according to claim 1, wherein the sensing unit is a thermal sensing unit, and a thermal conductivity coefficient of the protective layer ranges from 150 W/m·K to 500 W/m·K.

7. The card device according to claim 1, wherein the bezel surrounds the sensing unit and the protective layer, and the opening exposes the bezel.

8. The card device according to claim 1, wherein an upper surface of the bezel is aligned with a surface of the second substrate.

9. The card device according to claim 8, wherein the bezel extends from a bottom surface of the accommodating recess to a surface of the circuit board along a side wall of the accommodating recess.

10. The card device according to claim 1, wherein the accommodating recess has a depth, the second substrate has a thickness, and a distance between an upper surface of the protective layer and a bottom surface of the accommodating recess is equal to a sum of the thickness of the second substrate and the depth of the accommodating recess.

11. The card device according to claim 1, further comprising a chip, wherein the second substrate comprises another opening, and the chip is disposed in the another opening and electrically connected to the circuit board.

12. A method for manufacturing a card device, comprising:
providing a first substrate;
providing a second substrate, wherein the second substrate comprises an opening;
disposing a circuit board between the first substrate and the second substrate, wherein the circuit board comprises an accommodating recess corresponding to the opening;
providing a sensing unit;
forming a protective layer on a surface of the sensing unit, such that the protective layer and the sensing unit form a sensing module;
forming a bezel to surround the protective layer and the sensing unit; and
disposing the sensing unit with the protective layer formed on the surface in the accommodating recess, such that the sensing module surrounded by the bezel is disposed in the accommodating recess and the bezel is disposed between the accommodating recess and the sensing module, wherein the sensing unit is electrically connected to the circuit board, and the opening of the second substrate exposes the protective layer,
wherein the bezel exposes the protective layer.

13. The method for manufacturing the card device according to claim 12, wherein the protective layer is formed on the surface of the sensing unit through a deposition process.

14. The method for manufacturing the card device according to claim 12, wherein the protective layer is formed on the surface of the sensing unit through a coating process.

15. The method for manufacturing the card device according to claim 12, wherein the protective layer is formed on the surface of the sensing unit through an attaching process.

* * * * *